United States Patent
Rihn et al.

(10) Patent No.: US 10,532,279 B2
(45) Date of Patent: Jan. 14, 2020

(54) VIDEO GAMEPLAY HAPTICS

(71) Applicant: Immersion Corporation, San Jose, CA (US)

(72) Inventors: William S. Rihn, San Jose, CA (US); David M. Birnbaum, Oakland, CA (US); Robert W. Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/890,773

(22) Filed: Feb. 7, 2018

(65) Prior Publication Data

US 2018/0169521 A1   Jun. 21, 2018

Related U.S. Application Data

(63) Continuation of application No. 14/567,174, filed on Dec. 11, 2014, now Pat. No. 9,919,208.

(51) Int. Cl.
| | |
|---|---|
| *A63F 13/00* | (2014.01) |
| *A63F 13/285* | (2014.01) |
| *A63F 13/428* | (2014.01) |
| *A63F 13/211* | (2014.01) |
| *A63F 13/497* | (2014.01) |
| *A63F 13/218* | (2014.01) |

(52) U.S. Cl.
CPC .......... *A63F 13/285* (2014.09); *A63F 13/211* (2014.09); *A63F 13/218* (2014.09); *A63F 13/428* (2014.09); *A63F 13/497* (2014.09); *A63F 2300/1037* (2013.01); *A63F 2300/554* (2013.01); *A63F 2300/634* (2013.01)

(58) Field of Classification Search
None
See application file for complete search history.

(56) References Cited

U.S. PATENT DOCUMENTS 8,378,794 B2 *  2/2013  Alarcon ............... A61H 19/32
                                           340/407.1
8,597,093 B2 * 12/2013  Engelberg ........... G06F 19/3481
                                                  463/1

(Continued)

FOREIGN PATENT DOCUMENTS

| EP | 2605499 A1 | 6/2013 |
| EP | 2759908 | 7/2014 |

(Continued)

OTHER PUBLICATIONS

Any copies of information that are not included with this Information Disclosure Statement can be found in U.S. Appl. No. 14/567,174.

(Continued)

*Primary Examiner* — Paul A D'Agostino
(74) *Attorney, Agent, or Firm* — Kilpatrick Townsend & Stockton LLP

(57) ABSTRACT

A video game system records video gameplay by a player interacting with an endpoint, such as a game controller. The recording includes recording a haptic track of haptic effects generated on the endpoint during the gameplay and recording a video track of video generated during the gameplay. The recording further includes encoding the haptic track with the video track.

20 Claims, 3 Drawing Sheets

(56) References Cited

U.S. PATENT DOCUMENTS

| | | | |
|---|---|---|---|
| 9,411,422 B1 | 8/2016 | McClendon et al. | |
| 9,558,637 B2 | 1/2017 | Heubel et al. | |
| 9,878,239 B2 | 1/2018 | Heubel et al. | |
| 2003/0068053 A1 | 4/2003 | Chu | |
| 2006/0148571 A1* | 7/2006 | Hossack | A63F 13/10 463/43 |
| 2007/0242040 A1 | 10/2007 | Ulllrich et al. | |
| 2008/0113749 A1 | 5/2008 | Williams et al. | |
| 2008/0294984 A1 | 11/2008 | Ramsay et al. | |
| 2008/0300055 A1* | 12/2008 | Lutnick | G07F 17/3209 463/39 |
| 2009/0079690 A1* | 3/2009 | Watson | A63F 13/02 345/156 |
| 2010/0261526 A1* | 10/2010 | Anderson | G06F 3/017 463/31 |
| 2010/0283731 A1* | 11/2010 | Grant | G06F 3/016 345/158 |
| 2011/0021272 A1 | 1/2011 | Grant et al. | |
| 2011/0069229 A1 | 3/2011 | Lord | |
| 2011/0185378 A1 | 7/2011 | Johnson | |
| 2012/0100910 A1 | 4/2012 | Eichorn et al. | |
| 2012/0108337 A1* | 5/2012 | Kelly | G07F 17/3209 463/37 |
| 2012/0112894 A1 | 5/2012 | Yang et al. | |
| 2012/0296812 A1* | 11/2012 | Piccionelli | G07F 17/3234 705/39 |
| 2012/0296972 A1* | 11/2012 | Backer | H04L 65/403 709/204 |
| 2012/0302323 A1 | 11/2012 | Gagner et al. | |
| 2013/0198625 A1* | 8/2013 | Anderson | G06F 3/016 715/701 |
| 2013/0215024 A1 | 8/2013 | Nakayama et al. | |
| 2013/0215025 A1 | 8/2013 | Nogami et al. | |
| 2013/0217491 A1 | 8/2013 | Hilbert et al. | |
| 2013/0227409 A1* | 8/2013 | Das | H04L 51/32 715/702 |
| 2013/0227410 A1 | 8/2013 | Sridhara et al. | |
| 2013/0260896 A1 | 10/2013 | Miura et al. | |
| 2013/0307786 A1 | 11/2013 | Heubel | |
| 2013/0324250 A1* | 12/2013 | Sofman | A63H 30/04 463/31 |
| 2014/0004941 A1 | 1/2014 | Watson et al. | |
| 2014/0093221 A1 | 4/2014 | Wikander | |
| 2014/0094298 A1 | 4/2014 | Lyons et al. | |
| 2014/0094302 A1 | 4/2014 | Wilkiewicz et al. | |
| 2014/0139450 A1 | 5/2014 | Levesque et al. | |
| 2014/0155171 A1 | 6/2014 | Laakkonen et al. | |
| 2014/0176415 A1 | 6/2014 | Buuck et al. | |
| 2014/0205260 A1 | 7/2014 | Lacroix et al. | |
| 2014/0232657 A1 | 8/2014 | Aviles et al. | |
| 2014/0267904 A1 | 9/2014 | Saboune et al. | |
| 2014/0274297 A1 | 9/2014 | Lewis et al. | |
| 2014/0282750 A1 | 9/2014 | Civiletto | |
| 2015/0050998 A1 | 2/2015 | Stelovsky et al. | |
| 2015/0070150 A1 | 3/2015 | Levesque et al. | |
| 2015/0072789 A1 | 3/2015 | Heubel et al. | |
| 2018/0093178 A1 | 4/2018 | Heubel et al. | |

FOREIGN PATENT DOCUMENTS

| | | |
|---|---|---|
| EP | 3031502 | 3/2019 |
| JP | 2014121610 | 7/2014 |
| JP | 2014160529 | 9/2014 |
| WO | 2007047960 | 4/2007 |
| WO | 2014100770 | 6/2014 |
| WO | 2014131733 | 9/2014 |

OTHER PUBLICATIONS

European Application No. EP15002940.3 , "Notice of Decision to Grant", dated Feb. 28, 2019, 2 pages.
Japanese Application No. JP2015-219493 , "Office Action", dated Feb. 26, 2019, 3 pages.
U.S. Appl. No. 14/567,174 , "Final Office Action", dated Aug. 24, 2017, 10 pages.
U.S. Appl. No. 14/567,174 , "Non-Final Office Action", dated May 19, 2017, 10 pages.
U.S. Appl. No. 14/567,174 , "Non-Final Office Action", dated Dec. 2, 2016, 6 pages.
European Application No. EP15002940.3 , "Extended European Search Report", dated May 12, 2016, 7 pages.
European Application No. EP15002940.3 , "Office Action", dated Apr. 28, 2017, 6 pages.
European Application No. EP15002940.3 , "Summons to Attend Oral Proceedings", dated Jan. 5, 2018, 9 pages.
European Application No. EP19165089.4 , "Extended European Search Report", dated Jun. 12, 2019, 11 pages.
CN 201510747293.4, "Office Action," dated Aug. 5, 2019, 15 pages.

* cited by examiner

VIDEO GAMEPLAY HAPTICS

CROSS-REFERENCE TO RELATED APPLICATIONS

This application is a continuation of U.S. patent application Ser. No. 14/567,174, filed on Dec. 11, 2014, the specification of which is hereby incorporated by reference.

FIELD

One embodiment is directed generally to a haptic effects, and in particular to haptic effects for video gameplay.

BACKGROUND INFORMATION

Many video game players desire to relive or share their gaming accomplishments and experiences with others in video form. For example, there are many videos of gameplay footage available at online video services that highlight impressive displays of skill or interesting glitches, as well as artistic pieces incorporating gameplay footage. The most readily available method of acquiring such footage is for a player to record imagery from their television with a video camera, a process that can suffer greatly from capture quality issues and environmental noise. Screen capturing software can also be used to capture audio and video of gameplay.

However, recently introduced video game consoles have added replay recording and playback facilities, including sharing recorded replays with other users. For example, the "PlayStation PS4" system from Sony Corp. allows a user to upload and share screenshots or videos of gaming action online, as well as broadcasting/streaming the user's gameplay online. Online platforms such as "Twitch" consolidate many recorded or streaming gameplay videos, and even provide gameplay of competitions among video gamers that are streamed live to paying audiences.

SUMMARY

One embodiment is a video game system that records video gameplay by a player interacting with an endpoint, such as a game controller. The recording includes recording a haptic track of haptic effects generated on the endpoint during the gameplay and recording a video track of video generated during the gameplay. The recording further includes encoding the haptic track with the video track.

DETAILED DESCRIPTION

One embodiment captures haptic effects that are generated during a video gameplay, and then plays back the haptic effects while the video gameplay is viewed, either "live" during the gameplay via streaming, or at a later time. Further, another embodiment captures gestures and user inputs by a player during video gameplay, and plays back those gestures and user inputs in the form of haptic effects while the video gameplay is viewed live or at a later time. Therefore, a viewer can experience, during playback, the haptic effects felt by the player or "gamer" during gameplay, and/or the viewer can "feel" the input and gestures provided by the gamer during gameplay. The haptic effects can be played back on the same endpoint/peripheral (e.g., a game controller) on which the effects were originally generated, or translated for playback on a different type of endpoint.

Figure 1:
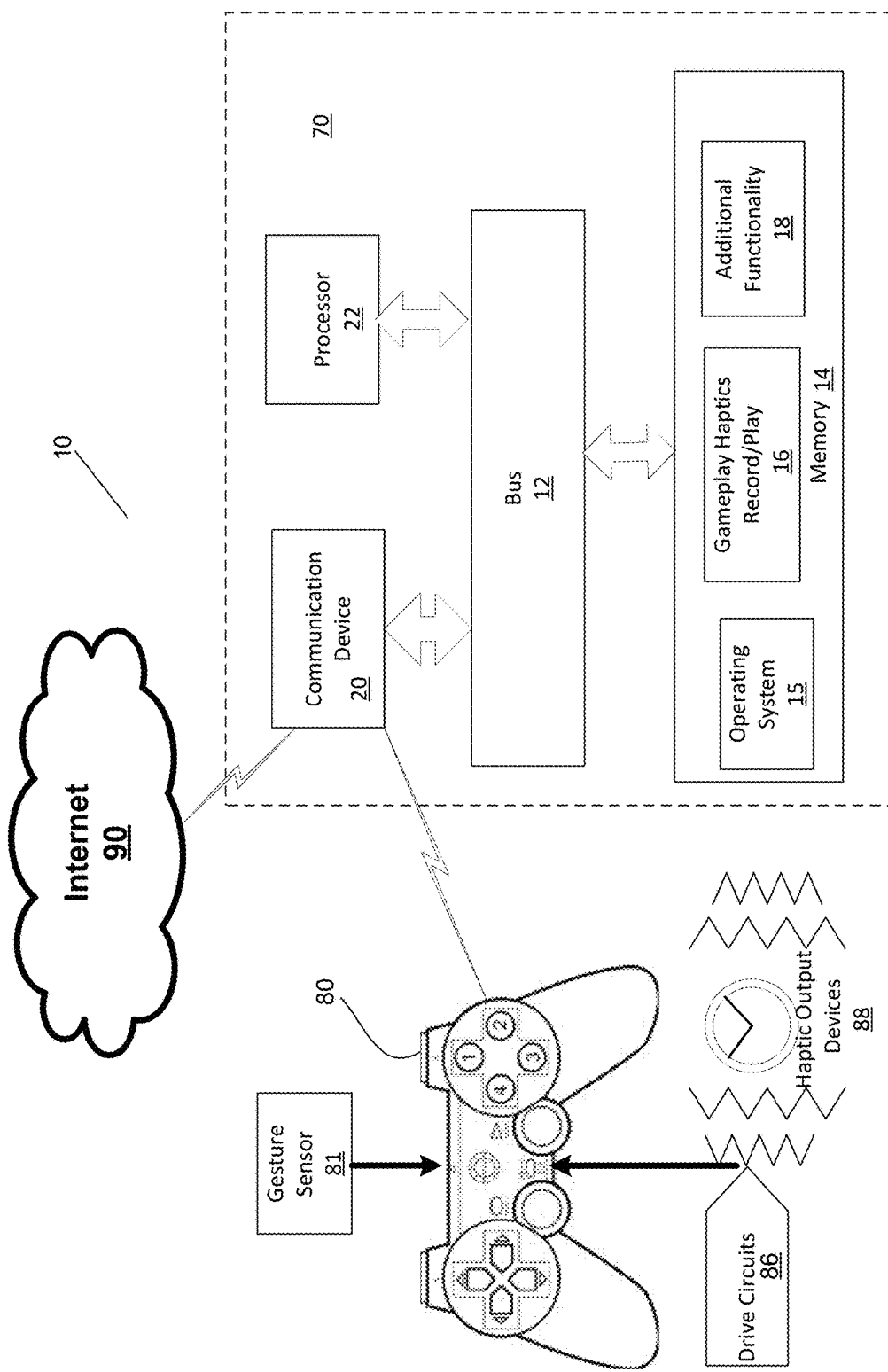
FIG. 1 is a block diagram of a system that can implement embodiments of the present invention.

FIG. 1 is a block diagram of a system 10 that can implement embodiments of the present invention. System 10 includes a server 70 coupled to an endpoint 80 via a communications link that can be wired or wireless. Endpoint 80 can be a video game controller, as shown in FIG. 1, or any type of device that can generate haptic effects in conjunction with a video game. Server 70 can be any processing device that implements the functionality disclosed herein.

System 10 includes a bus 12 or other communication mechanism for communicating information, and a processor/controller 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10. The modules further include a gameplay haptics record/play module 16 that records and/or plays haptic effects in conjunction with a video game, as disclosed in more detail below. System 10 will typically include one or more additional application modules 18 to provide additional functionality, such as Haptic Studio™ software by Immersion Corporation, or video game related software.

System 10, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem. Communication device 20 enables endpoint 80 to be communicatively coupled to server 70, and communicatively couples server 70 to external networks such as Internet 90.

Endpoint 80, in one embodiment is a game controller that includes known user interface devices, such as buttons, bumpers, joysticks, triggers, directional pads, driving wheels, etc. Endpoint 80 includes one or more haptic output devices 88 coupled to one or more drive circuits 86. Endpoint 80 further includes a gesture sensor 81 that senses the gestures when a video game player interacts with endpoint 80, such as the pushing of a button, the squeezing of a trigger, etc.

Haptic output device 88 may be any type of device that generates haptic effects. In one embodiment, haptic output device 88 is an actuator that generates vibratory type haptic effects. Actuators used for this purpose may include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Haptic output device 88 may also be a device such as an electrostatic friction ("ESF") device or an ultrasonic surface friction ("USF") device, or a device that induces acoustic radiation pressure with an ultrasonic haptic transducer. Other devices can use a haptic substrate and a flexible or deformable surface, and devices can provide projected haptic output such as a puff of air using an air jet, etc.

Haptic output device 88 may further be any type of device that causes user interfaces of endpoint 80 to "move" or otherwise generate haptic effects in order to mimic the physical interactions of a player on an endpoint that is the same or similar as endpoint 80. For example, if a player presses a button on a game controller, endpoint 80, in the form of the same type or similar game controller, will cause one its buttons to be similarly depressed through the use of a haptic output device 88, such as a motor.

Endpoint 80 may be a game controller, as described above, or any type of peripheral device, handheld device, or mobile device, such a cellular telephone, personal digital assistant ("PDA"), smartphone, computer tablet, gaming console, etc., or may be any other type of device that provides a user interface and includes a haptic effect system that includes one or more haptic output devices. In addition to buttons, joysticks, etc., the user interface may be a touch sensitive surface, or endpoint 80 may be a flexible/bendable device that generates haptic effects when physically manipulated, in which case the "user interface" is the flexible/bendable portion of the device itself.

Processor 22 outputs the control signals to drive circuit 86, which includes electronic components and circuitry used to supply haptic output device 88 with the required electrical current and voltage (i.e., "motor signals") to cause the desired haptic effects to be generated.

Although shown as separate systems in FIG. 1, endpoint 80 and server 70 may be combined into a physical single system, or any functionality shown in FIG. 1 may be separated from or included within endpoint 80.

For video games that generate haptic effects during gameplay, the various haptic effects, such as vibrations, will typically be generated on the game controller. In one embodiment, these haptic effects, that are "felt" by the video game player or "gamer", are recorded so that they can be played back during a gameplay video. Therefore, a "viewer" of the gameplay video, while holding a similar game controller, can feel the haptic effects that are being felt by the gamer. In another embodiment, during gameplay, the player's inputs (i.e., interactions with the player's game controller, such as pushing of buttons, etc.) are recorded so that they can be played back during a gameplay video.

Further, recorded haptic effects can be played back during a video gameplay. In one embodiment, the playback allows a viewer to feel the same haptic effects felt by the player, while the viewer is holding the same or a different endpoint that was used by the player. Therefore, video games that have implemented haptic effects can mirror/capture those haptic effects to viewers watching while adapting to any applicable peripheral that the viewer has during the viewing session.

In another embodiment, the playback allows the viewer to feel the player's interaction with the endpoint while playing the game, so that the viewer feels what the player does instead of what the player feels. This can be useful for tutorials/learning.

Figure 2:
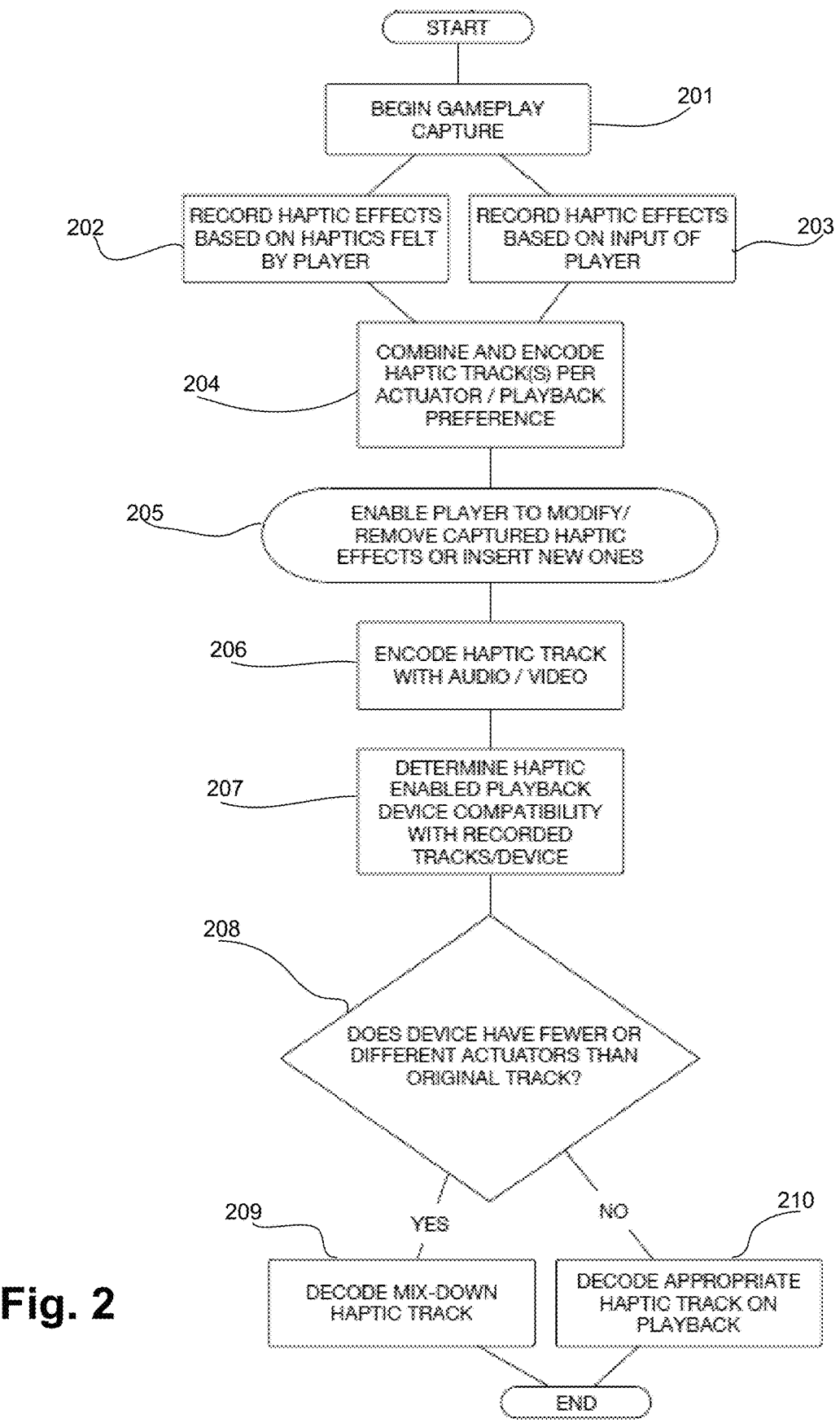
FIG. 2 is a flow diagram of the functionality of the system of FIG. 1 when capturing haptic input during the playing of a video game, and playing back the captured haptic input, in accordance with an embodiment.

FIG. 2 is a flow diagram of the functionality of system 10 of FIG. 1 when capturing haptic input during the playing of a video game, and playing back the captured haptic input, in accordance with an embodiment. In one embodiment, the functionality of the flow diagram of FIG. 2 (and FIG. 3 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIGS. 2 and 3 can be performed by the same system 10 of FIG. 1, or by different systems 10 of FIG. 1 (e.g., one system 10 for recording haptic effects, and a different system 10 for playing back the haptic effects)

At 201, gameplay haptic effect capture begins. The initiation of the gameplay haptic effect capture can occur at the same time and coincide with audio/video gameplay capture. The initiation can begin in response to input from the player, can be automatically initiated at all times when gameplay occurs, such as during the entire gameplay or during a rolling window (e.g., the previous five minutes of gameplay will always be recorded and available), or using any known initiation method. In one embodiment, the initiation occurs automatically during significant events in the gameplay, such as when a player is "killed".

At 202, in one embodiment, the haptic effects felt by the player are recorded. For a game controller such as game controller 80 of FIG. 1 with multiple types of haptic output devices 88, in multiple locations, the recorded haptic effects would include the identity/location of each haptic output device, as well as the haptic effect generated by the output device. The recorded haptic effects can be recorded inside the controller based on haptic commands it receives from an external processor or a device such as a gaming console (e.g., gaming console 70), or the recorded haptic effects can be recorded inside the console based on haptic commands generated by the content or game.

The haptic effect can be recorded as a haptic effect signal that includes haptic parameters. In general, high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction. Directionality may be another parameter, such as if a trigger were pushing out or pulling in. Other parameters can be related to the envelope of the effect, such as the length/rate of attack and decay.

At 203, in another embodiment, or as a separate haptic track from the haptic track of 202, the haptic effects that are recorded are based on the input interactions of the player.

Gesture sensor 81 senses the player's interactions with endpoint 80, such as the pushing of buttons, the squeezing of triggers, the pressing of gamepads, the motion or orientation of the controller, etc. The sensing can include the force of the interactions, the frequency/timing of interactions, etc. The sensing data is converted to corresponding haptic effects that would simulate the player's interactions on another endpoint 80 during playback.

After the recording at either 202 or 203 (or in other embodiments, both types of recording can be made), at 204 the recorded haptic effects are encoded/combined in the form of a haptic track per haptic output device and/or a separate track for 202 and 203. In one embodiment, for each haptic output device in the playback endpoint, a separate haptic effect track will be generated. The haptic effect track may vary depending on the type/properties of the intended haptic output device that will be used for playback. In some embodiments, the haptic output device on the playback endpoint will be identical to the corresponding haptic output device on the recording endpoint, such as when identical game controllers are used. In other embodiments, when different endpoints are used, the number/type/location, etc., of the haptic output devices may differ between the two endpoints.

For example, recording a game player pushing a button or pulling a trigger can generate a haptic effect that is generated for the viewer's controller that will pull in and push out the button/trigger, rendering the input as a haptic effect. If the button is pressed with enough force, speed, or at a maximum throw, then the effect might render both a pull and push for the viewer. However, if a trigger/button is lightly pulled or pressed, it might render effects only in one direction to further illustrate to the viewer the force exerted on the button/trigger.

In conjunction with 204, at 205 the gameplay player can modify/remove any captured haptic effects or insert new haptic effects in a "post-production" period prior to finalizing. The effects available for the player to add may be contextually based on the effects captured, the type of game/genre, achievements/awards unlocked, and the recorded actions of the game. For example, there likely would not be an option to add a galloping pony across a war zone, as this would not fit into the context of the game.

At 206, the haptic track or tracks are encoded with the audio/video tracks using known encoding methods. As a result, the timing of the haptic tracks will be synchronized with the audio/video tracks.

At 207, for playback of the gameplay, which would include the haptic/audio/video tracks, the haptic enabled playback device compatibility with the recorded tracks is determined. If the playback device is the same as the recording device, 100% compatibility is achieved. However, in other situations, the playback device will be different than the recording device. The differences can include the number/type/location/etc. of the haptic output devices. The different types of devices can include whether or not an actuator is capable of multiple directions or multiple frequencies, or where in the device the actuator may be mounted (e.g., relevant to tuning parameters).

At 208, in conjunction with 207, it is determined if the playback device has fewer or different actuators than are in the recording device, or that are otherwise referenced in the original recorded track.

Figure 3:
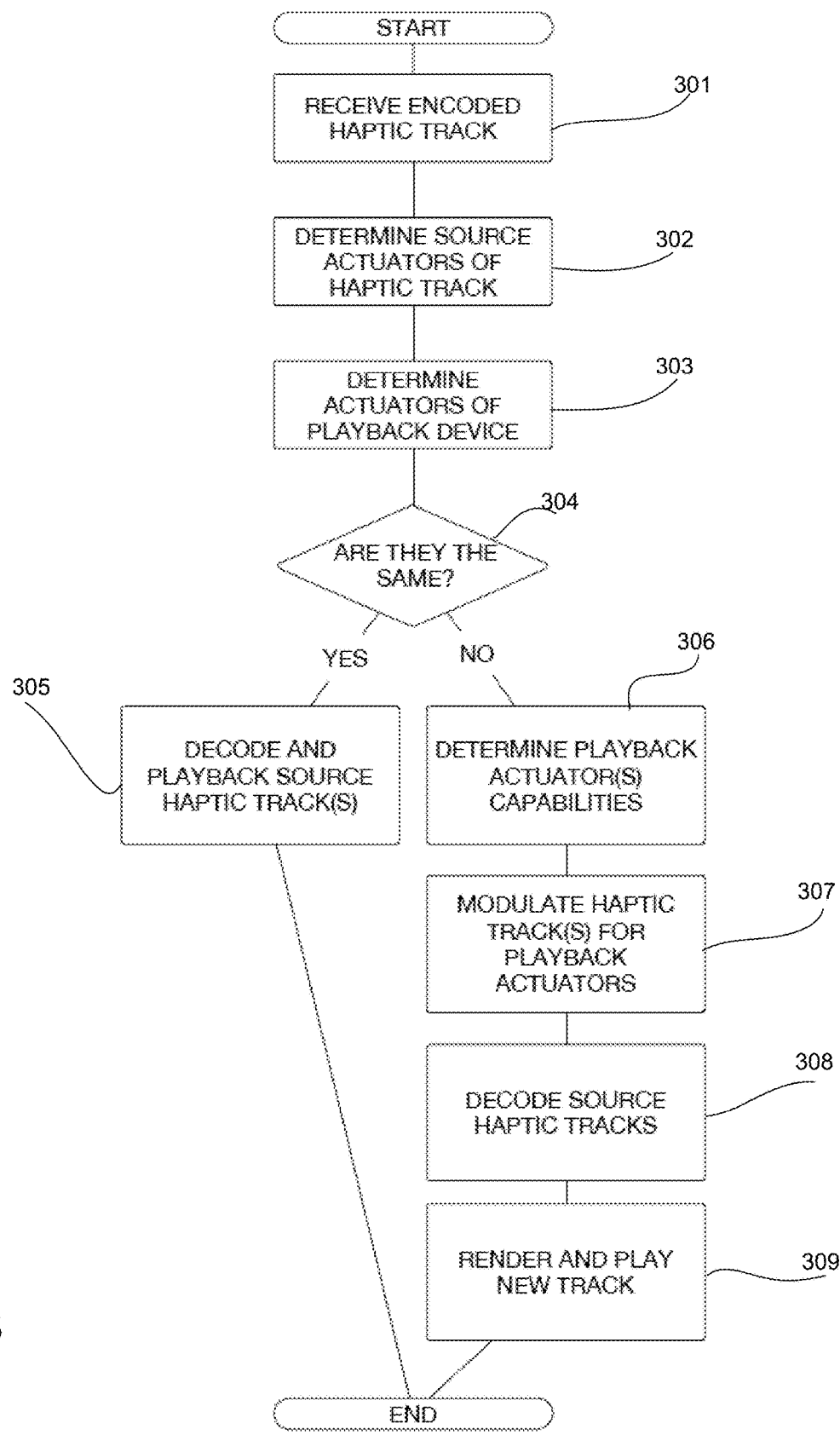
FIG. 3 is a flow diagram of the functionality of the system of FIG. 1 when decoding a haptic track for playback that was previously encoded in accordance with an embodiment.

If yes at 208, during playback, a mix-down of the haptic track is decoded, as disclosed in more detail in conjunction with FIG. 3.

If no at 210, during playback, the appropriate haptic track is decoded, as disclosed in more detail in conjunction with FIG. 3.

Although FIG. 2 describes the "automatic" recording of haptic effects along with the gameplay, in other embodiments the haptic effects can be added manually using haptic authoring tools. A game might have pre-set badges, stickers, emoticons, icons, animations, etc., with associated haptic effects that may be added to captured gameplay. Alternatively, they might be contextualized as disclosed above. Additionally, games may enable players to perform specific game functions in isolated environments to capture audio, visual, or haptic effects to add in a post-production capacity.

FIG. 3 is a flow diagram of the functionality of system 10 of FIG. 1 when decoding a haptic track for playback that was previously encoded in accordance with an embodiment.

At 301, the encoded haptic track is received. The haptic track may have been encoded as described in conjunction with FIG. 2.

At 302, the actuators, or haptic output devices, that were the source of the haptic track are determined. In an embodiment where the haptic effects are felt by the player, the type/location/etc. of each haptic output device is determined. For the embodiment where the player's input is recorded, the type/location/etc. of the interface that received the player's input would be recorded (e.g., left button, right trigger, etc.).

At 303, the types/locations/etc. of the actuators, or haptic output devices, of the playback device are determined.

At 304, it is determined if the haptic output devices are the same. In most circumstances, they will be the same at 304 only when the playback device and recording device are identical types of devices, such as the same type of game controller.

If yes at 304, at 305 the haptic track is decoded and the source haptic track is played, along with the source audio/video track during a gameplay video.

If no at 304, at 306 the capabilities of the playback device, in terms of number/type/location of haptic output devices is determined.

At 307, the haptic track is modulated to account for the determined capabilities at 306. Modulation of haptic track may be determined in numerous ways. In one embodiment, it can be based on frequency. For example, if a source haptic effect was created on an actuator with a similar operating frequency to the playback actuator, the signal may be modified very little compared to when the playback actuator has a vastly different operating frequency than the source. Further, tracks designed for multi-frequency capable actuators may have effects split and routed to actuators capable of the appropriate frequency in a multi-actuator device (without an identical actuator to the source material).

Effects may also be modulated by actuator response times. For example, a trigger actuator may have a fast response time and may translate well directly to an LRA. However, trigger effect signals would need to be changed from periodic gap-like effects to solid signal effects for certain low ERM actuators, and vice versa.

At 308, the source haptic tracks are decoded.

At 309, the new track is rendered and played.

In one embodiment, the haptic track includes a timeline, and a "null" signal or a haptic signal at various points on timeline indicating that a haptic effect should not, or should be generated at that time. In another embodiment, the haptic track specifies a particular time to play a particular haptic effect, as identified by an identity of a pre-stored haptic effect signal, or the actual haptic effect signal.

As disclosed, embodiments record a haptic track that is combined with audio/video tracks of a video gameplay. In one embodiment, the user records gameplay video that does not have haptics. The user can then employ a haptic authoring tool to add haptic effects to the video.

In another embodiment, the user records gameplay video, which also records a haptic track based on the haptic effects generated by the game. This haptic track would feel the same (if the viewer were holding the same peripheral), or it may be simplified for other actuators.

In another embodiment, the user records a gameplay video and the haptic track is generated based on the input of the user during gameplay of the player. If the player were to use the same haptically-enabled peripheral, they would feel the buttons that the player pressed while playing the game. Otherwise, the haptic effects can be modified for different actuators.

In another embodiment, the user is playing in a video game tournament that is being broadcast live. The viewers can then enable haptics to feel what the player(s) (depending on who they lock their camera onto) press in real time.

In another embodiment, the user is playing a video game that is being broadcast live. The viewers can feel the same effects as the player when using the same peripheral or a simplified track for alternate actuators.

In another embodiment, a localized streaming of effects (both from the gameplay and the player input) is provided. For example, other game controllers, such as those held by an observer of the game locally, can feel the same haptic effects as the player of the game.

As disclosed, embodiments allow for the recording of haptic effects generated during gameplay, or player inputs applied during gameplay. As a result, during playback of the gameplay, or "live" during the gameplay, the viewer can feel the same haptic effects that are felt by the player, or can feel the inputs applied by the player.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method for reproducing haptic interactions, the method comprising:
   receiving a video track and a haptic track, the video track synchronized with the haptic track, and the haptic track generated according to a first input interaction on a first endpoint;
   generating a modified haptic track based on the haptic track and at least one of a user input or a second endpoint; and
   transmitting an output that includes the video track and the modified haptic track,
   wherein the output is configured to generate a second input interaction on the second endpoint, wherein the second input interaction reproduces the first input interaction.

2. The method according to claim 1, wherein the second endpoint includes one or more haptic output devices to generate the second input interaction.

3. The method according to claim 1, wherein the video track includes a video game and the first input interaction includes an application of force on the first endpoint by a player of the video game.

4. The method according to claim 3, wherein the second input interaction is generated in real-time and is synchronized with a display of a real-time stream of the video track.

5. The method according to claim 4, wherein the real-time stream of the video track is displayed live while the player interacts with the video game using the first endpoint.

6. The method according to claim 1, wherein the first endpoint includes a game controller, and the first input interaction includes a physical interaction with at least one of a button, a trigger, a bumper, a joystick or a directional pad.

7. The method according to claim 6, further comprising:
   determining if the second endpoint, different from the first endpoint, is a same type as the first endpoint, wherein the output is configured to reproduce the first input interaction to generate the second input interaction on the second endpoint based at least in part on the determining.

8. The method according to claim 6, wherein the output is configured to simplify the first input interaction that are reproduced to generate the second input interaction when the second endpoint has different capabilities than the first endpoint.

9. A non-transitory computer readable storage medium storing one or more programs configured to be executed by a processor, the one or more programs comprising processor-executable instructions configured to cause the processor to:
   receive a video track and a haptic track, the video track synchronized with the haptic track, and the haptic track generated according to a first input interaction on a first endpoint;
   generate a modified haptic track based on the haptic track and at least one of a user input or a second endpoint; and
   transmit an output that includes the video track and the modified haptic track,
   wherein the output is configured to generate a second input interaction on the second endpoint, wherein the second input interaction reproduces the first input interaction.

10. The non-transitory computer readable storage medium according to claim 9, wherein the second endpoint includes one or more haptic output devices to generate the second input interaction.

11. The non-transitory computer readable storage medium according to claim 9, wherein the video track includes a video game and the first input interaction include an application of force on the first endpoint by a player of the video game.

12. The non-transitory computer readable storage medium according to claim 11, wherein the second input interaction is generated in real-time and is synchronized with a display of a real-time stream of the video track.

13. The non-transitory computer readable storage medium according to claim 12, wherein the real-time stream of the video track is displayed live while the player interacts with the video game using the first endpoint.

14. The non-transitory computer readable storage medium according to claim 9, wherein the first endpoint includes a game controller, and the first input interaction include a physical interaction with at least one of a button, a trigger, a bumper, a joystick or a directional pad.

15. A device comprising:
   a processor; and
   a memory storing processor-executable instructions configured to cause the processor to:

receive a video track and a haptic track, the video track synchronized with the haptic track, and the haptic track generated according to a first input interaction on a first endpoint;

generate a modified haptic track based on the haptic track and at least one of a user input or a second endpoint; and transmitting an output that includes the video track and the modified haptic track, wherein the output is configured to generate a second input interaction on the second endpoint, wherein the second input interaction reproduces the first input interaction.

16. The device according to claim 15, wherein the second endpoint includes one or more haptic output devices to generate the second input interaction.

17. The device according to claim 15, wherein the video track includes a video game and the first input interaction includes an application of force on the first endpoint by a player of the video game.

18. The device according to claim 17, wherein the second input interaction is generated in real-time and is synchronized with a display of a real-time stream of the video track.

19. The device according to claim 18, wherein the real-time stream of the video track is displayed live while the player interacts with the video game using the first endpoint.

20. The device according to claim 15, wherein the first endpoint includes a game controller, and the first input interaction includes a physical interaction with at least one of a button, a trigger, a bumper, a joystick or a directional pad.

* * * * *